(12) United States Patent
Zamir

(10) Patent No.: US 10,503,532 B2
(45) Date of Patent: Dec. 10, 2019

(54) CREATING A VIRTUAL MACHINE CLONE OF THE HOST COMPUTING DEVICE AND HANDLING OF VIRTUAL MACHINE CLONE REQUESTS VIA AN I/O FILTER

(71) Applicant: VMware, Inc., Palo Alto, CA (US)

(72) Inventor: Tal Zamir, Haifa (IL)

(73) Assignee: VMware, Inc., Palo Alto, CA (US)

( * ) Notice: Subject to any disclaimer, the term of this patent is extended or adjusted under 35 U.S.C. 154(b) by 65 days.

(21) Appl. No.: 14/752,786

(22) Filed: Jun. 26, 2015

(65) Prior Publication Data

US 2016/0378527 A1 Dec. 29, 2016

(51) Int. Cl.
*G06F 9/455* (2018.01)
*G06F 3/06* (2006.01)
*G06F 9/4401* (2018.01)

(52) U.S. Cl.
CPC ........ *G06F 9/45558* (2013.01); *G06F 3/0623* (2013.01); *G06F 3/0665* (2013.01); *G06F 3/0676* (2013.01); *G06F 3/0679* (2013.01); *G06F 9/4401* (2013.01); *G06F 2009/45562* (2013.01)

(58) Field of Classification Search
CPC .... G06F 9/45558; G06F 3/0619; G06F 3/065; G06F 3/0665; G06F 3/067; G06F 9/4401
See application file for complete search history.

(56) References Cited

U.S. PATENT DOCUMENTS

| 6,901,403 B1* | 5/2005 | Bata .................. G06F 16/26 |
| 7,529,897 B1 | 5/2009 | Waldspurger |
| 8,001,079 B2 | 8/2011 | Lu |
| 8,156,301 B1 | 4/2012 | Khandelwal |
| 8,346,727 B1* | 1/2013 | Chester ............ G06F 17/30233 707/640 |
| 8,453,145 B1* | 5/2013 | Naik .................. G06F 9/45558 718/1 |
| 8,463,882 B2* | 6/2013 | Witt ..................... G06F 9/5077 709/220 |
| 9,659,074 B1* | 5/2017 | Natanzon ........... G06F 9/45558 |
| 2008/0275923 A1 | 11/2008 | Haselton |
| 2009/0260007 A1* | 10/2009 | Beaty .................. G06F 9/5077 718/1 |
| 2010/0122248 A1* | 5/2010 | Robinson ............... G06F 9/485 718/1 |

(Continued)

*Primary Examiner* — Meng Ai T An
*Assistant Examiner* — Jorge A Chu Joy-Davila

(57) ABSTRACT

Techniques are described for creating a virtual machine clone of a physical host computing device. A hosted hypervisor running within a host operating system on the physical computing device receives a request to boot a virtual machine clone of the device. In response to the request, the hosted hypervisor synthesizes a virtual disk that is comprised of a master boot record of the host computing device, a read-only snapshot obtained from a volume snapshot service of the host operating system and a delta virtual disk for recording changes. The hosted hypervisor then launches the virtual machine clone by attaching the synthesized virtual disk to the virtual machine clone and booting the guest operating system from the master boot record and the snapshot. Any changes made during the use of the virtual machine clone can be automatically propagated back and applied to the physical host device.

11 Claims, 6 Drawing Sheets

(56) References Cited

U.S. PATENT DOCUMENTS

| | | | |
|---|---|---|---|
| 2010/0235831 A1* | 9/2010 | Dittmer | G06F 9/45558 718/1 |
| 2012/0185427 A1* | 7/2012 | Fontignie | G06F 11/1435 707/609 |
| 2012/0246640 A1* | 9/2012 | Marshall | G06F 9/45558 718/1 |
| 2013/0132691 A1* | 5/2013 | Banga | G06F 21/53 711/162 |
| 2014/0149352 A1 | 5/2014 | Chan | |
| 2015/0033217 A1 | 1/2015 | Mellor | |
| 2016/0224364 A1* | 8/2016 | Herrendoerfer | H04L 63/0428 |
| 2016/0246683 A1 | 8/2016 | Vijayan | |

* cited by examiner

CREATING A VIRTUAL MACHINE CLONE OF THE HOST COMPUTING DEVICE AND HANDLING OF VIRTUAL MACHINE CLONE REQUESTS VIA AN I/O FILTER

RELATED APPLICATIONS

This application is related to U.S. patent application Ser. No. 14/752,794, entitled PROPAGATING CHANGES FROM A VIRTUAL MACHINE CLONE TO A PHYSICAL HOST DEVICE by Tal Zamir, filed on the same date as the present application, which is incorporated by reference in its entirety herein.

TECHNICAL FIELD

The present disclosure generally relates to computer virtualization and more particularly relates to creating a virtual machine clone of a physical device in hosted hypervisor environments.

BACKGROUND

In computing, virtualization generally refers to the process of creating a virtual machine (VM), which is a software-based abstraction or emulation of a physical computer. A VM can be a full representation of a real physical computer, including a virtual representation of the hard drive (referred to herein as a virtual disk or a virtual machine disk (VMDK)), and the VM can run a full instance of a complete operating system (referred to as a "guest" operating system), such as Microsoft Windows. A physical computer typically executes one or more VMs using virtualization software called a hypervisor. The physical computer on which the hypervisor is running is usually referred to as the "host" computer, while the individual VMs are referred to as "guests."

Hypervisors can generally be classified into two categories—the type 1 or "native" hypervisors (also sometimes referred to as "bare metal" hypervisors) and the type 2 or "hosted" hypervisors. Native hypervisors run directly on the host computer's hardware and host multiple virtual machines that have individual guest operating systems. In contrast, hosted hypervisors are installed on a conventional host operating system (e.g., Windows, Linux, etc.) and thus hosted hypervisors represent a second layer of software above the hardware. The present disclosure is primarily relevant to hosted hypervisor environments, however this should not be viewed as a limitation since some of the techniques described herein may be applicable to native hypervisors as well.

Virtual machines provide great value to end users. Software developers often use local virtual machines to ease the research and development (R&D) process, leveraging local integrated development environment (IDE) integration for convenient debugging in an isolated environment, in which experimentation is safe. Quality assurance (QA) engineers use virtual machines for efficiently testing software and pushing it to its limits. Information Technology (IT) departments use virtual machines for testing software updates before mass deployment to end users and for reproducing issues. Mobile sales engineers and trainers use local virtual machines for demonstration purposes, allowing them to safely replay a live demonstration. Security professionals use virtual machines for investigating malware in a safe manner.

However, in most of these cases, the virtual machines are clean, unused machines that do not have the same characteristics as real-world end user machines. For example, these virtual machines typically would not have multiple applications installed, complex configurations or many user data files, as no real users have actually used these virtual machines as a primary desktop. Therefore, many of the virtualization benefits described above are lost: software developers and quality engineers may not be able to detect or investigate bugs that only occur on real-world machines; IT may only find out that a patch causes issues after it has been deployed to real users (and the damage is already done)—and would not be able to reproduce real user issues on a clean machine. Additionally, the creation of virtual machines for these purposes—even if only with a clean operating system and a few applications—is a time-consuming process that also requires significant amounts of storage capacity.

One solution to this problem would be to convert a real user's physical machine (e.g., laptop, personal computer, etc.) into a virtual machine clone. There are a number of situations in which this may be useful. For example, experienced "power" users could then use the virtual machine clone to safely troubleshoot issues or try software before they install it on their physical devices and potentially damage them. Developers could use the virtual machine clone to test and debug software on their own, real-world, desktops. Malware researchers and security professionals could use the virtual machine clone to investigate malware or to temporarily work in a safer sandboxed environment.

Currently, there exist some tools that provide the functionality to convert a physical device into a virtual machine clone. However, such tools typically require that all of the files on the physical machine be copied to the virtual machine, a process that could take a lengthy amount of time for a real-world machine and potentially require a lot of storage space on the target disk. For example, copying all of the content may take hours to complete and the user must have a huge amount of free space available (i.e., enough storage capacity to contain copies of all the content on the physical machine). Additionally, once the user has finished using the virtual machine clone, if the user wants to propagate some of their changes from the virtual machine back into the original physical device, they must do so manually—which is an error-prone and time-consuming process. A more efficient approach to creating a virtual machine clone of a physical computing device is desirable.

DETAILED DESCRIPTION

Figure 1:
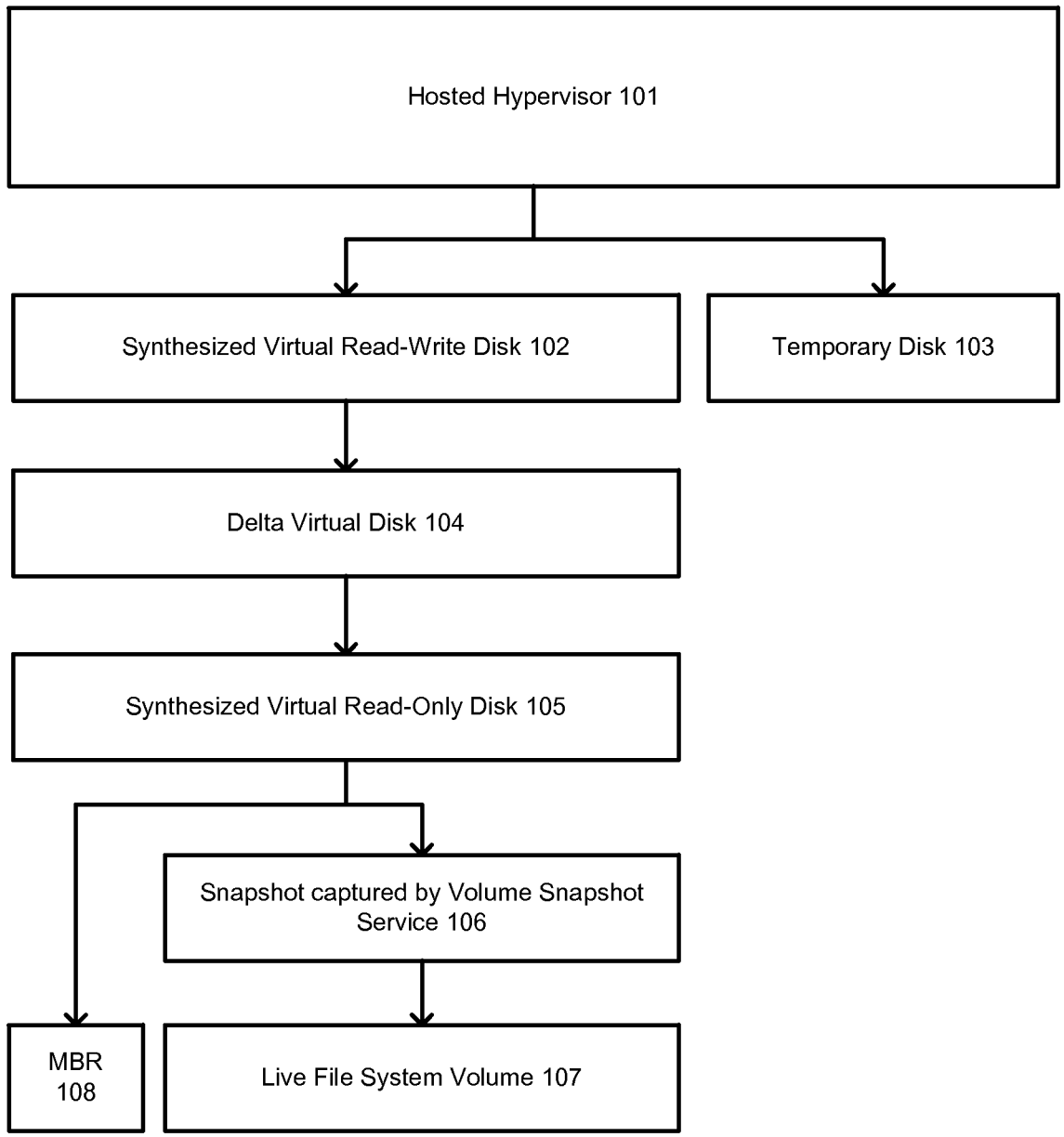
FIG. 1 illustrates an example of a system level diagram of a host computing device that is able to launch a virtual machine clone, in accordance with various embodiments.

Systems and methods in accordance with the embodiments of the present disclosure provide more efficient ways to create a virtual machine clone of a physical computing device. By utilizing the techniques described herein, a user's physical computing device (e.g., Windows machine) can be instantly or nearly instantly cloned into a local virtual machine such that the process requires little additional storage capacity upfront and is completed faster than previously possible. Furthermore, the techniques described herein enable a user to select an existing older point-in-time snapshot of their physical device for cloning and are not restricted to the current/latest version of the physical device. In addition, the user may continue working on the physical computing device and on the virtual machine clone simultaneously, without any interruption.

In various embodiments, the physical host computing device of a user includes a host operating system which runs a hosted hypervisor (i.e., type 2 hypervisor) capable of executing one or more virtual machines. A user can request to launch (i.e., boot, start, instantiate) a virtual machine clone of the physical host computing device. In response to the request, the hosted hypervisor synthesizes a virtual disk that will be used to launch the virtual machine clone. This synthetic virtual disk includes the master boot record (MBR) of the host computing device, a read-only snapshot obtained from the volume snapshot service of the host operating system of the host device, and a delta virtual disk for recording any user changes. Internally, the synthetic virtual disk uses the local snapshot service of the host operating system (e.g., Windows' volume shadow service (VSS), etc.) to access an instant point-in-time read-only snapshot of the local file-system. The synthetic virtual disk also employs a delta virtual disk to keep a block-level delta of the underlying file-system, so that the snapshot is not required to duplicate the entire local file-system. Once the synthetic virtual disk has been synthesized, the hosted hypervisor boots the virtual machine clone by attaching the synthesized virtual disk to the virtual machine. The user is then able to use the virtual machine as their regular computer, e.g., to safely try out new changes on the virtual machine clone before making those changes on their regular physical device, test out potential malware, troubleshoot problems, and the like.

After the user has finished using the virtual machine clone, the user may request to propagate any changes back to the physical host computing device. Alternatively, the user may revert back to the host computing device without retaining any changes made on the virtual machine clone. If the user requests to propagate the changes back to the host computing device, the changes recorded in the delta virtual disk of the synthesized disk may be scanned by a first agent (e.g., application, thread, process, task, etc.) operating in the virtual machine clone and uploaded to a remotely located server via network connection. A corresponding second agent running on the host operating system of the host computing device may subsequently download the changes from the remote server and merge the changes onto the host computing device. In an alternative embodiment, the first agent operating in the virtual machine clone may directly communicate the changes to the second agent operating in the host operating system, such as by a local in-memory interface. If the changes merely contain user data files (e.g., files in the "Documents" folder), the system may simply synchronize the folder of the virtual machine clone containing the changes with the corresponding folder of the host operating system. One the other hand, if the detected changes also contain installed applications, operating system changes, or changed settings, the detected changes may be first written to a designated staging directory and merged to the appropriate locations on the host computing device during a subsequent reboot. In this manner, any changes made by the user to the virtual machine clone are applied to the user's regular environment on the host computing device, i.e., the changes are applied to the host operating system, as well as the data and applications installed on the host operating system. The propagation of all these changes by the agents can be done in the background without requiring interaction from the user.

In various embodiments, aside from the hosted hypervisor itself, the system to enable the creation of the virtual machine clone described above can be comprised of the following components: (1) component of the user interface of the hosted hypervisor, allowing a user to request and create a VM that is a clone of the physical host computing device; (2) component that is able to invoke the creation of snapshots (e.g., Windows VSS snapshots, etc.) as necessary or reuse existing snapshots (if such snapshots exist); (3) component that specializes the virtual machine clone instance such that it does not share the same unique name or identifier as the host computing device; (4) an internal disk input/output (I/O) filter that is running as part of the hosted hypervisor for intercepting disk read requests; and (5) component that allows the user to propagate some of the changes—e.g. user data, settings or applications—from the virtual machine clone back to the physical host computing device.

The ability described herein to immediately create such virtual machine clones within a very short time period makes local virtualization a handy tool and opens new use cases that may not have been relevant in the past. For example: a user is able to safely use an old previously created virtual snapshot of their entire machine (including its applications) to create a VM clone; a user can try installing a new untrusted application in a virtual clone of their physical machine before installing it on their real machine; developers, QE and IT can employ real-world instant virtual clones to achieve their respective goals in an easier and more efficient manner; among others.

FIG. 1 illustrates an example of a system level diagram of a hosted hypervisor and synthesized virtual disk for a virtual machine clone, in accordance with various embodiments. As previously mentioned, the host computing device includes a hosted hypervisor 101 that is running within a host operating system on a physical computing device. The hosted hypervisor 101 can be used to execute one or more virtual machines, including a virtual machine clone of the physical computing device.

In one embodiment, a user can initiate the process of creating a virtual machine clone of the physical host computing device by launching the interface of the hosted hypervisor and requesting to boot an instant clone of the current system. Alternatively, the user may select one of the existing point-in-time snapshots of the host computing device to boot from, in the event that the user wishes to create a virtual machine clone having the state of the host computing device at some time in the past. In this case, when the user interface (UI) of the hosted hypervisor presents the user with a list of existing snapshots, the date/time of each snapshot can be displayed alongside the snapshot. Additionally, the hosted hypervisor can check if a snapshot was captured as part of a Windows system restore point. If it was, the UI can present the description of the system restore point that better explains which event triggered the snapshot creation.

There are a number of user interface options for the user to request the virtual machine clone. For example, a user can use a wizard specifically designated for the purpose of creating a local virtual clone of the user's currently running physical machine. In this case, the wizard can also suggest other VM settings (e.g., RAM, CPU cores) based on the hardware of the host computing device and the host operating system version. Alternatively, a user can use a standard VM creation wizard of the hosted hypervisor and select to create a virtual disk based on a new or existing snapshot of a local disk on the host computing device when creating a new VM. In yet another embodiment, a user can customize an existing VM's hardware (e.g., using the interface of the hosted hypervisor) to add a virtual disk that is backed by existing or new snapshots of a local disk.

Once the user requests a virtual machine clone to be created, the hosted hypervisor 101 synthesizes a virtual read-only disk 102 for the virtual machine clone. In one embodiment, the synthesized virtual disk can be implemented as a Windows disk device which is composed of the underlying master boot record 108 (including the partition table) of the local disk and the user-selected snapshot 106 of the live file system volume 107 (e.g. NTFS volume) which is obtained from the volume snapshot service of host operating system (e.g., Windows). For example, if the user selects to create a new virtual machine clone of his currently running physical machine, snapshots for all of the volumes in the local disk(s) would be requested from the volume snapshot service of the host operating system. These snapshots would be used for the virtual machine clone's synthetic disk.

The volume snapshot service is a service provided by the host operating system that provides a mechanism to capture point-in-time snapshots of the host computing device. One example of such a service is the Volume Shadow Copy Service (VSS), which was introduced by Microsoft with the release of Windows XP. Originally, the main purpose of VSS snapshots was to enable backup applications to instantly create volume snapshots that provide read-only access to all files in the volume, including files that are currently open by running processes. Each snapshot is at the partition/volume level and does not span an entire disk. VSS has been a built-in feature in all Windows versions starting with Windows XP, and is conventionally turned on by default. In some versions of Windows, (e.g., Windows Vista and subsequent releases), VSS has been used by Microsoft to implement a System Restore feature that automatically takes a volume shadow copy before each application is installed. Conventionally, when an application requests that a snapshot be taken using Microsoft Windows VSS, the VSS asks participating applications (called VSS writers) to flush their data to the file system, so that their data is logically consistent on disk when the snapshot is taken. VSS then freezes all write operations for a short time interval while a VSS provider actually creates the shadow copy. The shadow copy provider creates the shadow copy by using a copy-on-write mechanism. Thus, after the snapshot point in time and before a file block write operation is allowed to proceed, the original contents of the block are copied aside to the snapshot storage. In this way, the snapshot only requires as much storage as the amount of modified file blocks. This provider is also designed so that multiple VSS snapshots of the same volume share file blocks, reducing the overall size of the VSS shadow storage for a volume. It should be noted that VSS does not require applications to participate or be aware of the snapshotting mechanism. All files in the volume are part of the snapshot, but logical consistency of application file content can only be guaranteed for applications that are VSS-aware and provide a VSS writer. Because of this architecture and the copy-on-write mechanism, VSS snapshots can be created almost instantaneously and in practice require only a few seconds to complete. Additionally, the snapshots consume very little disk space, in proportion to the volume's file blocks that were changed after the snapshot was taken.

It should be noted that the various embodiments described herein are not limited to Windows VSS. In some alternative embodiments, other volume snapshot services of other operating systems may be utilized within the scope of this disclosure. For example, the Linux operating system includes a service called Device Mapper, which provides the ability to create snapshots of any block device. In the context of Linux Device Mapper, snapshots are mountable saved states of the block device which are also writable without interfering with the original content. In some embodiments, Device Mapper can be used by the hosted hypervisor to obtain a read-only snapshot when creating the synthesized virtual disk.

As mentioned above, the hosted hypervisor can leverage the volume snapshot service of the host operating system (e.g., VSS, Device Mapper, etc.) to provide nearly instant cloning of a physical computing device into a local virtual machine clone running inside the hosted hypervisor. In particular, the hosted hypervisor can synthesize the virtual read-only disk 105 by obtaining the snapshot 106 of the volume 107 from the volume snapshot service and combining it with the master boot record 108 of the host computing device. Because the snapshots can be taken nearly instantaneously, creating such a VM clone is nearly instantaneous as well and can be completed within a few seconds.

In order to provide read-write capability to the virtual machine clone, a delta virtual disk 104 is added, which saves all of the block write commands to temporary storage. The delta virtual disk 104 operates to capture any changes that may be made by the user or by executing the virtual machine clone. That is, when the virtual machine issues a command to modify a block (or memory page, file etc.), the delta virtual disk will create a copy of the existing read-only block and save the modification as the copy (i.e., the changes are written to the delta disk instead of the read-only snapshot). The read-only block may also be marked to specify that this block was modified and the new modified copy of the block should be used instead of the read-only block. By adding the delta virtual disk 104, the hosted hypervisor is able to create a synthesized virtual read-write disk 102 which can be attached to the virtual machine clone. In addition, a temporary disk 103 can be attached to the virtual machine clone, which is used for saving volatile files, such as pagefile and temporary files of the VM clone. The temporary disk 103 serves to reduce load from the delta virtual disk 102 for the more common temporary files. It should be noted that in some alternative embodiments, instead of a delta virtual disk, a copy-on-write layer can be implemented to enable the synthesized disk to store user changes on the virtual machine clone.

In various embodiments, the total disk space required by the virtual machine clone is composed of the following two parts:

1. The total disk space consumed by the snapshot—this size starts at zero right after the snapshot is taken, and grows as file changes are being made to files on the host operating system. The total size of a snapshot is the total size of file blocks that were modified on the host after the snapshot was taken. Note that if the same partition block is modified multiple times after the snapshot was taken, it is still only stored once in the snapshot.
2. The total size of a VM delta disk 104. This depends on the total size of modified disk blocks on the guest operating system after the VM clone was created.

In practice, the overall size of the virtual machine clone typically amounts to very little storage for the snapshot when compared to a full disk clone that would require completely duplicating the local disk(s), potentially amounting to hundreds of gigabytes of data. Furthermore, in the use case of creating an instant virtual clone of an already-existing snapshot, there is no additional storage overhead for the snapshot, as the existing snapshot consumes its space regardless of the creation of a virtual machine clone.

Once the synthesized virtual read-write disk 102 and the temporary disk 103 have been created, the VM clone can be started, booting the operating system from the synthetic disk. Before launching the VM, the hosted hypervisor 101 can mount the synthesized virtual read-write disk device 102 and use offline domain join to join the virtual machine clone to the domain with a new name that is different from the name of the host computing device in order to avoid name collision. For example, whenever a Windows machine is being cloned (regardless of the cloning technique) it must undergo several processes to make it a unique entity. One such common requirement is that the cloned machine's name must be different from the name of the original machine and this new name must be properly registered in Active Directory. These processes are sometimes called "specialization" and there are some existing tools to make the specialization processes easier and more efficient. For example, rejoining the virtual machine clone to the domain can be done by employing the Windows "offline domain join" feature, which would allow booting the virtual machine clone immediately with the new machine name, without requiring any additional reboots.

There are several alternative methods to allow the hosted hypervisor to use the synthesized disk. In one embodiment, to allow the hosted hypervisor to use the synthetic disk, a disk I/O filter can be utilized. With this mechanism, a filter is deployed in the hosted hypervisor that can intercept disk block requests from the guest operating system before these requests are passed along to the underlying virtual disk. When local virtual machine clone is set up, a synthetic disk is established per local disk. Each synthetic disk is a thinly provisioned virtual machine disk (VMDK) of the same logical size as the corresponding local disk, but containing only the Master Boot Record (MBR), in the first sector of the disk. Therefore, the total underlying size of this VMDK is one sector only. The MBR is important for proper booting of the operating system as it contains the first boot code and the partition table. The MBR can be replicated from the local disk to the VMDK when synthesizing the virtual disk. The disk I/O filter is attached to this VMDK. The filter intercepts calls from the guest operating system of the virtual machine clone as follows:

Get disk size: This call returns the size of the corresponding local disk of the host computing device.

Read block from offset X: If the block is part of a partition, the block would be fetched from the corresponding snapshot. Otherwise (e.g., a request for the MBR, or a request for a block that is not part of any partition), the request is passed on to the thin-provisioned VMDK.

Write block to offset X: Fails. The synthetic disk I/O filter only provides read-only access. To allow writes, a VMDK delta disk 104 is used on top of the read-only disk layer.

In an alternative embodiment, instead of a deploying an I/O filter to the hosted hypervisor, a synthetic disk driver can be deployed within the host operating system of the physical device. This synthetic disk appears in the host OS as a regular physical locally-attached disk (e.g. it would appear in the list of local disks). However, instead of being a real disk, this synthetic disk actually consists of read-only snapshots; one snapshot per local disk partition. When the OS tries to read a block from the synthetic disk, the synthetic disk driver redirects the request to the corresponding offset in the snapshot or to the replicated MBR, depending on the request. When the OS tries to write a block to the synthetic disk, the synthetic disk driver redirects the write to a separate block storage location (as writes cannot be made to the read-only snapshots). In this embodiment, the hosted hypervisor need not be aware that the disk behind this synthetic disk driver is not a physical disk but rather a synthetic disk.

After the user is finished using the virtual machine clone and the virtual machine clone is shut down, the hypervisor can discard the temporary disk 103 and the delta virtual disk 102. Alternatively, if the user wants to propagate the changes they made on the virtual machine clone back to the physical host computing device, agent software can be used to upload only the changed files (including OS changes, application changes, settings, etc.) to a remotely located server and then download the changes back onto the physical host computing device, automatically. Alternatively, the propagation of changes can be directly using local communication on the host computing device. This propagation of changes back is described in further detail with reference to FIG. 2 below.

Figure 2A:
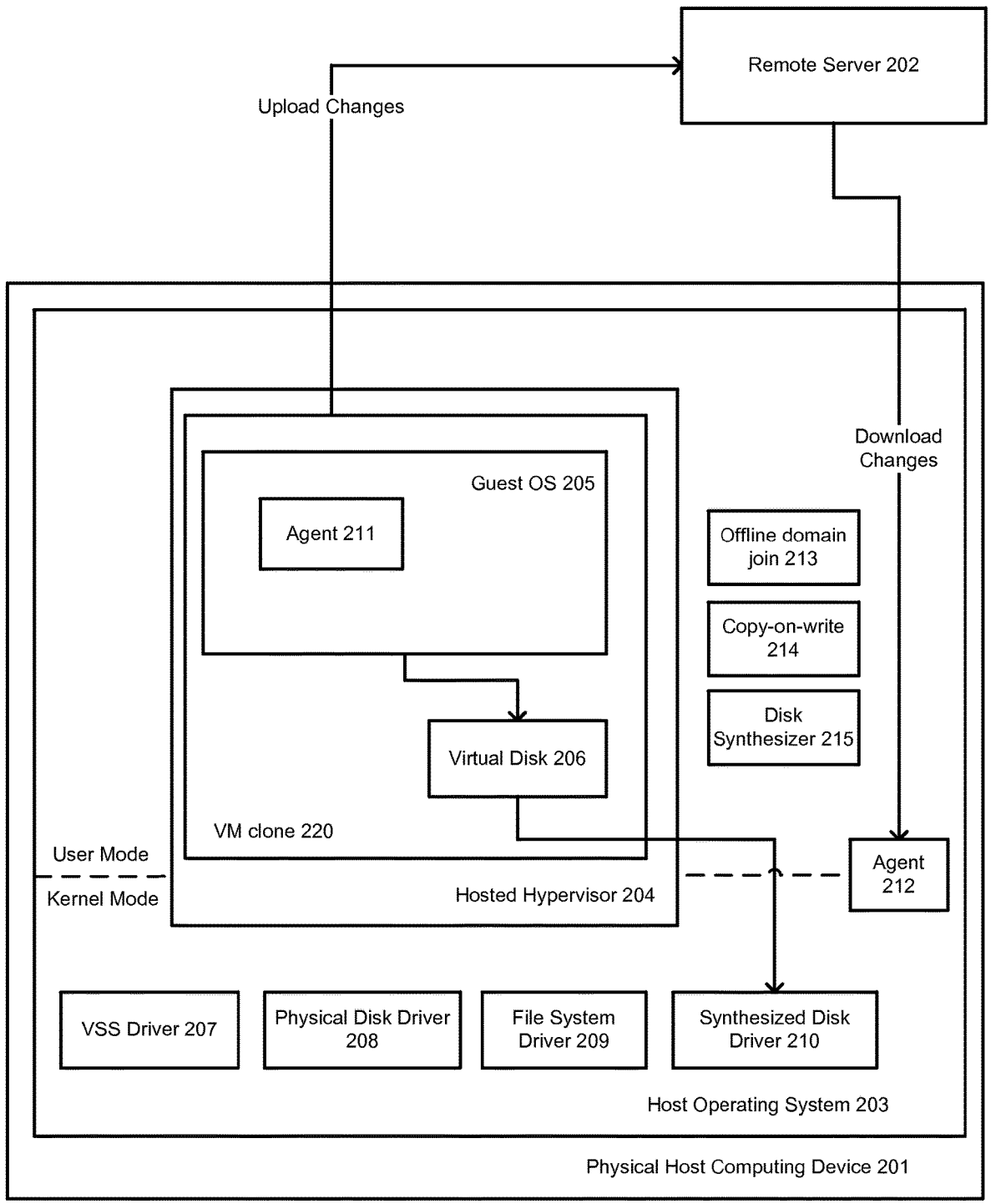
FIG. 2A illustrates an example of a system that can propagate the changes made on a virtual machine clone back to the host computing device, in accordance with various embodiments.

FIG. 2A illustrates an example of a system that can propagate the changes made on a virtual machine clone back to the host computing device, in accordance with various embodiments. As previously mentioned, the host computing device 201 includes a host operating system 203 that is running a hosted hypervisor 204. The host OS 203 can include a number of drivers, including the VSS driver 207, the physical device driver 208, the file system driver 209 and the synthesized disk driver 210. Furthermore, the host OS can include a service to provide the offline domain join 213, a copy-on-write service 214 and a disk synthesizer 215, as previously described. It should be noted, however, that while these services are illustrated in this figure as being part of the host operating system 203, this is not a limitation to all embodiments described herein. In other alternative embodiments, these or other services may be operating in the hosted hypervisor 204 instead, depending on the implementation selected.

As further shown in FIG. 2A, the host operating system includes an agent 212 that works together with a corresponding agent 211 operating in the guest OS 205 of the virtual machine clone in order to propagate any changes that the user has made while using the virtual machine clone. As previously mentioned, the user can use the cloned local VM as they see fit and potentially dispose of the VM clone when it is no longer needed. In some cases, discarding the changes is useful since the changes may have caused malicious software to be installed, errors or bugs to be introduced, or other unwanted consequences of using the virtual machine clone. However, in other cases, a user might select to retain and propagate changes from the virtual machine clone back to the physical host computing device. In these situations, copying all of the changes manually from the guest to the host would require the user to manually track which changes were made and to copy them one-by-one back into the host, making the process error-prone and time consuming.

To deal with this issue, the agent 211 installed in the guest OS of the virtual machine clone and the agent 212 installed in the host OS 203 can interact to propagate the changes from the virtual machine clone to the physical host device 201. The user can pick whether they would like to propagate any of the user data files, user settings, user-installed applications, operating system changes or any subset of the above. When the user requests such propagation, the agent 211 inside the guest OS 205 would scan the guest file-system and registry for file and registry changes. These changes would then be automatically copied back into the host operating system 203, using a parallel agent 212 running in the host OS 203.

In one embodiment, the agent 211 operating in the guest OS 205 of the virtual machine clone 220 uploads all of the selected changes to a remote server 202 using a network, such as a local area network (LAN), wide area network (WAN) or other connection. Subsequently, the agent 212 operating in the host operating system 203 can download these changes from the remote server 202 and merge the changes onto the host computing device 201. That is, the agent 212 can synchronize the user files/folders between the guest OS 205 and the host OS 203, apply the operating system changes and settings to the host OS 203, and the like. In some embodiments, the propagation of changes from the agent 211 to the remote server 202 and from the remote server 202 to the agent 212 can be done as a background process, transparently and without requiring any further interaction from the user.

In an alternative embodiment (not shown), instead of uploading the changes to a remote server, the agent 211 operating inside the virtual machine clone 220 can communicate the changes to the agent 212 operating in the host OS using a local interface, such as the virtual machine communication interface (VMCI) or the like. This may also be performed without requiring the user to manually transfer the changes one by one.

If the detected changes only contain user data files (e.g. the only changes are to files in the user's "Documents" folder), the system would synchronize the user data files with the corresponding folders in the host file-system. This can be achieved using any of the known file and folder synchronization technologies that are available. Otherwise, if the detected changes also contain user-installed applications, OS changes, or user settings, the host agent 212 can stage all of the changes in a designated side staging directory on the host and ask the user to reboot the machine (or wait for the next reboot) to complete the propagation process. On reboot, the file-system and registry settings would be merged into the host, using image merge technology. Some examples of image merging techniques are described in U.S. Pat. No. 8,112,505 entitled "ON-DEMAND BLOCK-LEVEL FILE SYSTEM STREAMING TO REMOTE DESKTOPS", and in U.S. patent application Ser. No. 14/169,016 filed Jan. 30, 2013, entitled "MERGING OF DESKTOP IMAGES" each of which is incorporated by reference herein in its entirety.

Figure 2B:
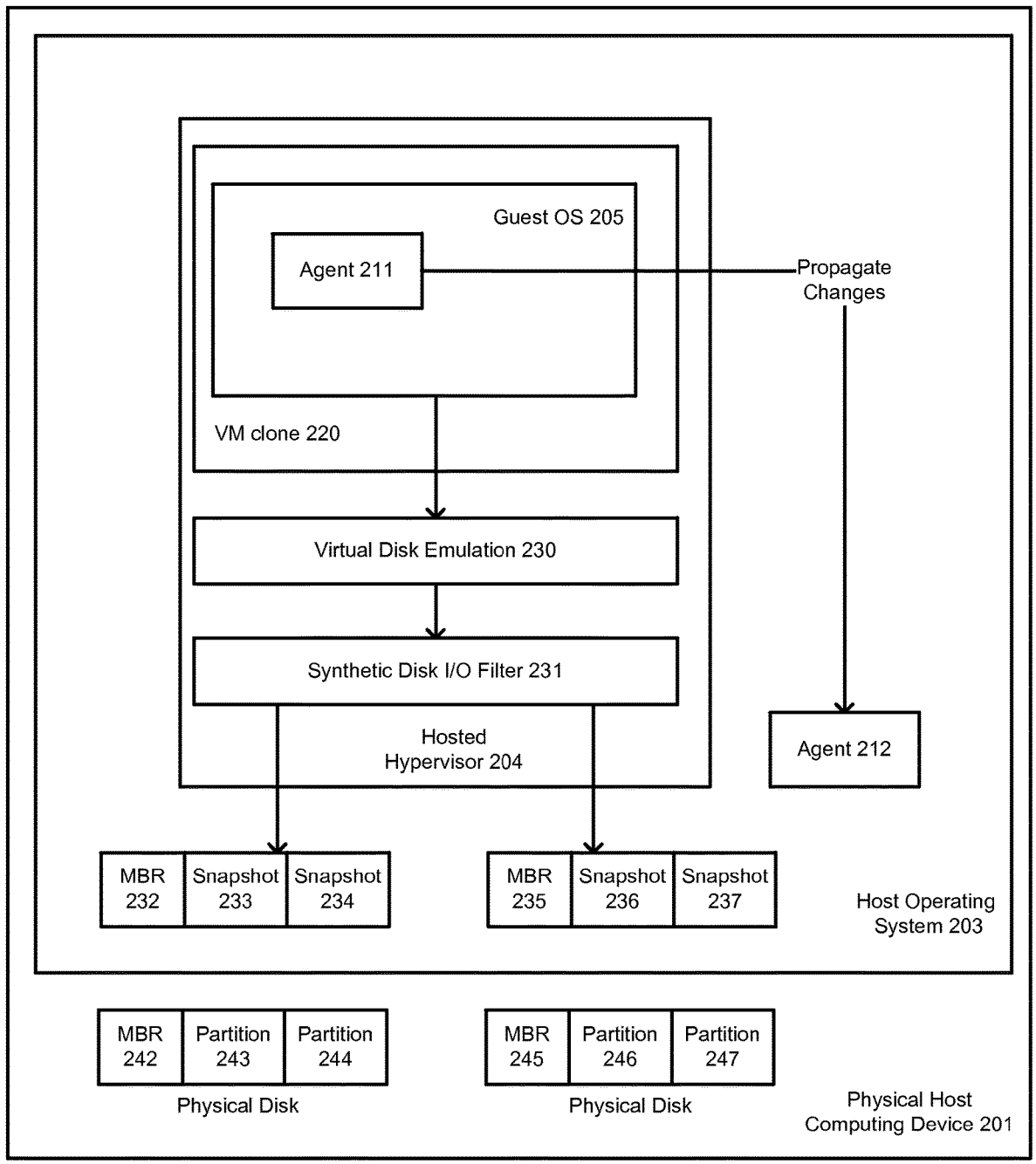
FIG. 2B illustrates an alternative example of a system that can propagate changes made on the virtual machine clone back to the physical host computing device, in accordance with various embodiments.

FIG. 2B illustrates an alternative example of a system that can propagate changes made on the virtual machine clone back to the physical host computing device, in accordance with various embodiments. In this illustration, similar to FIG. 2A, the physical host computing device includes a host operating system 203 which runs a hosted hypervisor 204 which can be used to create a virtual machine clone 220 having the guest OS 205. In this illustration, however, instead of utilizing a physical disk driver in the host OS 203, the system can utilize a virtual disk emulation layer 230 and a synthetic disk I/O filter 231 in order to provide access to the synthetic virtual disk. The synthetic disk I/O filter 231 runs in the hosted hypervisor 204 instead of the host OS 203 kernel. The synthetic disk I/O filter 231 intercepts read requests coming from the guest OS 205 of the virtual machine clone 220 and directs the read requests to the read-only volume snapshots (233, 234, 236, 237) of the physical disk partitions (243, 244, 246, 247).

As previously mentioned, when the system sets up the local virtual machine clone, it sets up a synthetic disk per local physical disk. Each synthetic disk is a thin-provisioned virtual disk (e.g. VMDK) of the same logical size as the corresponding local disk, but containing only the Master Boot Record (232, 235), in the first sector of the disk. Therefore, the total underlying size of this VMDK is one sector only. The MBR is important for proper booting of the operating system as it contains the first boot code and the partition table. The MBR in the virtual disk (232, 235) is replicated from the MBR of the physical disk (242, 245).

Another difference between FIG. 2A and FIG. 2B is that in FIG. 2B, the changes are propagated directly from agent 211 operating in the guest OS 205 to agent 212 operating in host OS 203 using a local (e.g., in-memory) communication interface and without contacting any remote server over the network. This can be advantageous because the changes can be propagated much faster (i.e., without network latency) without the need for a network connection.

Figure 3:
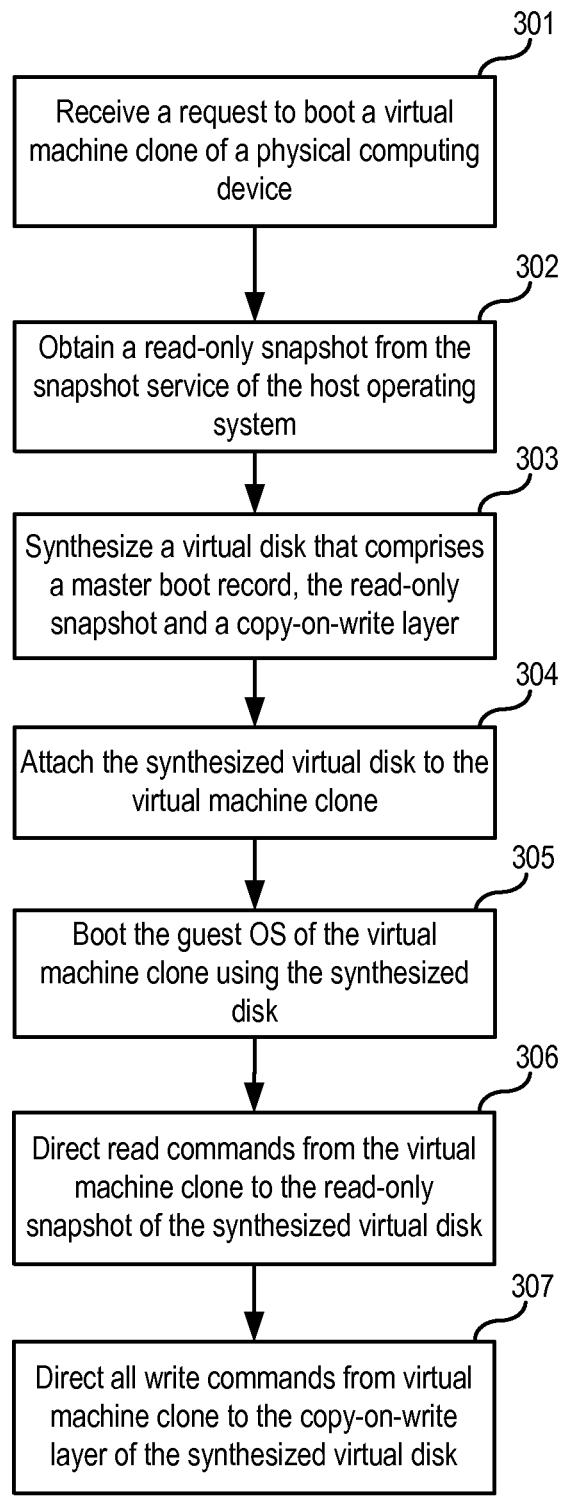
FIG. 3 illustrates an example a process for creating a virtual machine clone of a physical host computing device, in accordance with various embodiments.

FIG. 3 illustrates an example a process for creating a virtual machine clone of a physical host computing device, in accordance with various embodiments. In operation 301, a request is received to boot a virtual machine clone of a physical computing device. In one embodiment, the request is initiated by a user and the request is provided to the hosted hypervisor running on the host computing device. In operation 302, the hosted hypervisor obtains a read-only snapshot from the volume snapshot service of the host operating system. For example, the hosted hypervisor may request a shadow copy from the VSS service of Microsoft Windows operating system. In operation 303, the hosted hypervisor synthesizes a virtual disk that will be used to boot the virtual machine clone of the host computing device. The synthesized disk is comprised of a master boot record (which has been replicated from the host device), the read-only snapshot which has been obtained from the volume snapshot service and a delta virtual disk to store any changes made to the virtual machine clone.

In operation 304, the synthesized disk is attached to the virtual machine clone. In operation 305, the guest operating system of the virtual machine clone is booted, using the MBR and the read-only snapshot of the synthesized disk. Once the guest OS has been booted, the read commands from the virtual machine clone are directed to the read-only snapshot of the synthesized virtual disk as shown in operation 306 (unless the read operation is requesting a block which has already been modified on the virtual machine clone). All write commands are directed from the virtual machine clone to the delta virtual disk of the synthesized virtual disk, as shown in operation 307.

Figure 4:
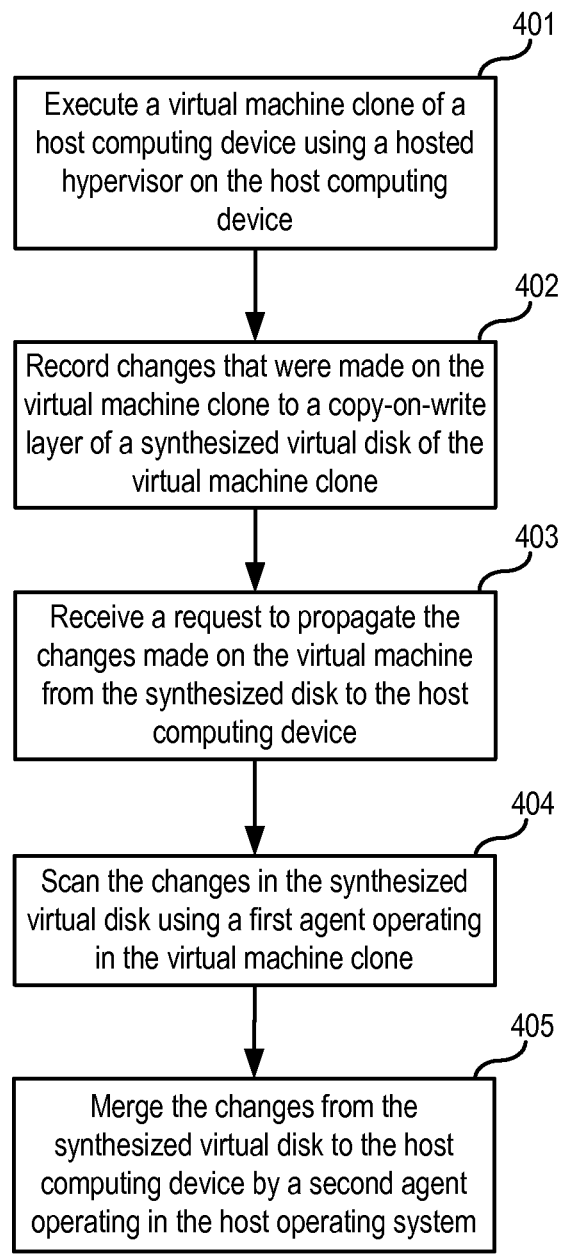
FIG. 4 illustrates an example of a process for propagating changes made on the virtual machine clone back to the physical host computing device, in accordance with various embodiments.

FIG. 4 illustrates an example of a process for propagating changes made on the virtual machine clone back to the physical host computing device, in accordance with various embodiments. In operation 401, a virtual machine clone of a physical host computing device is executed using a hosted hypervisor running on the host OS of the host device. The virtual machine clone is using a synthesized virtual disk, as previously described. During the execution of the virtual machine clone, the changes that are made on the virtual machine clone are recorded to the delta virtual disk of the synthesized virtual disk, as shown in operation 402.

Once the user finishes using the virtual machine clone, the VM clone may either be discarded or the user may request to propagate the changes back to the physical host. If the hosted hypervisor receives the request to propagate the changes from the synthesized disk to the host computing device (operation 403), respective agents operating in the VM clone and in the host OS can carry out the propagation of changes back to the host device. In operation 404, a first agent operating in the guest OS on the virtual machine scans the changes on the synthesized disk (i.e., the delta virtual disk). In operation 405, the changes are merged onto the host OS of the device using a second agent operating in the host OS. In one embodiment, the changes are uploaded by the first agent to a remote server over a network connection and subsequently downloaded by the second agent from the remote server to the host device. In another embodiment, the changes are communicated directly from the first agent to the second agent using a local in-memory interface.

Figure 5:
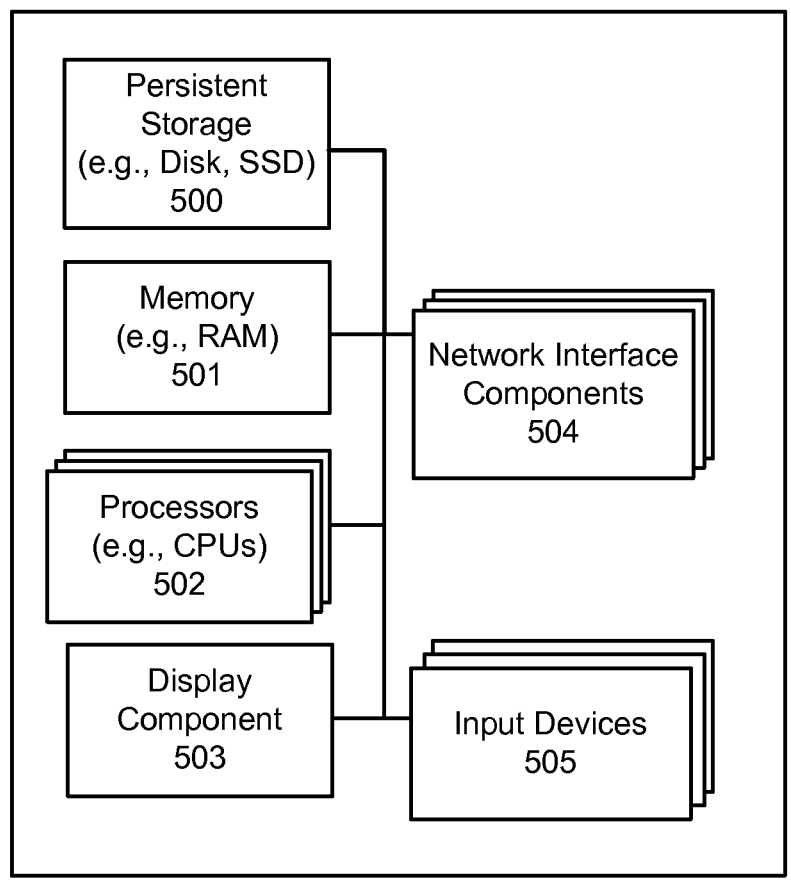
FIG. 5 illustrates an example of some general components of a computing device, in accordance with various embodiments.

FIG. 5 illustrates an example of some general components of a computing device that can be utilized in conjunction with various embodiments described in the present specification. In this particular example, the computing device includes one or more processors (e.g., central processing units (CPUs) 502 for executing instructions that can be stored in a storage medium. The storage medium may take the form of memory 501 (e.g., RAM), persistent storage 500 (e.g., disk, flash, SSD, etc.) or any combination thereof. As used herein, the terms "storage medium", "computer readable storage medium", and "non-transitory storage medium" are all used interchangeably and can include many different types of volatile memory or persistent storage, such as random access memory (RAM) storing program instructions for execution by the processor 502, a separate form of storage for images or data, a removable memory for sharing information with other devices and the like.

The computing device typically further comprises a display component 503, such as a computer monitor, a touch screen, liquid crystal display (LCD), light-emitting diode (LED) display, or the like. The display component 503 is conventionally used to display images or information to the user so that the user may interact with the computing device. In various embodiments, the computing device will also include a set of input devices 505 capable of receiving input from a user. This input can include, for example, a conventional keyboard, a mouse, a button, a touch pad, a touch screen, or any other such component whereby a user can input a command to the device, provide information to the device or otherwise interact with the device. In some embodiments, the computing device can include one or more network interface components (NICs) 504 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for cloning a virtual machine of a host computing device, the method comprising:
   in a hypervisor running within a host operating system on the host computing device, receiving a request to boot a virtual machine clone of the host computing device on the host computing device from which the virtual machine clone is cloned;
   in response to the request, synthesizing, by the hypervisor, for each local physical disk of the host computing device, a virtual disk that is comprised of a master boot record (MBR) of the host computing device, a read-only snapshot obtained from a volume snapshot service of the host operating system of the host computing device from which the virtual machine is cloned and a delta virtual disk, wherein the synthesized virtual disk is a thinly provisioned virtual machine disk initially of a same logical size as the MBR contained in a first sector of the synthesized virtual disk, and subsequently grows as changes are made to the delta virtual disk over time; and
   booting the virtual machine clone of the host computing device from the synthesized virtual disk on the host computing device from which the virtual machine clone was cloned;
   wherein booting the virtual machine clone includes deploying an input/output (I/O) filter in the hypervisor and attaching the I/O filter to the synthesized virtual disk, the I/O filter configured to intercept disk block requests from a guest operating system (OS) of the virtual machine clone before the disk block requests are passed to a virtual disk of the virtual machine clone, wherein the I/O filter:
   in response to a get disk size request, returns a size of the corresponding local physical disk of the host computing device;
   in response to a read block request, fetches the block from the read-only snapshot if the block is part of a partition of the corresponding local physical disk, otherwise, if the request is for the MBR or for a block that is not part of any partition, it is passed on to the thin-provisioned virtual machine disk; and
   in response to a write block request, fails due to the I/O filter providing only read-only access, wherein all write block requests are passed to the delta virtual disk.

2. The method of claim 1, wherein receiving the request to boot the virtual machine clone further comprises:
   receiving a selection of a snapshot from a plurality of point-in-time snapshots of the host computing device displayed to a user, wherein the virtual machine clone is associated with a state of the host computing device at the time associated with the selected point-in-time snapshot.

3. The method of claim 1, further comprising:
   associating the virtual machine clone with a unique name that is different from the name of the host computing device; and
   registering the unique name of the virtual machine clone with an active directory.

4. The method of claim 1, wherein the volume snapshot service of the host operating system is the Windows Shadow Copy Service (VSS).

5. A computing device, comprising:
   at least one processor; and
   a storage medium including instructions that, when executed by the at least one processor, cause the computing device to execute:
   a host operating system on the computing device;
   a hosted hypervisor executing within the host operating system, the hosted hypervisor capable of managing one or more virtual machines, the hosted hypervisor configured to
   receive a request to boot a virtual machine clone of the computing device on the computing device from which the virtual machine clone is cloned;
   in response to the request, synthesize, by the hypervisor, for each local physical disk of the computing device, a virtual disk that is comprised of a master boot record (MBR) of the computing device, a read-only snapshot obtained from a volume snapshot service of the host operating system of the computing device from which the virtual machine is cloned and a delta virtual disk, wherein the synthesized virtual disk is a thinly provisioned virtual machine disk initially of a same logical size as the MBR contained in a first sector of the synthesized virtual disk, and subsequently grows as changes are made to the delta virtual disk over time; and
   boot the virtual machine clone of the computing device from the synthesized virtual disk on the computing device from which the virtual machine clone was cloned;
   wherein booting the virtual machine clone includes deploying an input/output (I/O) filter in the hypervisor and attaching the I/O filter to the synthesized virtual disk, the I/O filter configured to intercept disk block requests from a guest operating system (OS) of the virtual machine clone before the disk block requests are passed to a virtual disk of the virtual machine clone, wherein the I/O filter:

in response to a get disk size request, returns a size of the corresponding local physical disk of the host computing device;

in response to a read block request, fetches the block from the read-only snapshot if the block is part of a partition of the corresponding local physical disk, otherwise, if the request is for the MBR or for a block that is not part of any partition, it is passed on to the thin-provisioned virtual machine disk; and in response to a write block request, fails due to the I/O filter providing only read-only access, wherein all write block requests are passed to the delta virtual disk.

6. The computing device of claim 5, wherein receiving the request to boot the virtual machine clone further comprises:

receiving a selection of a snapshot from a plurality of point-in-time snapshots of the computing device displayed to a user, wherein the virtual machine clone is associated with a state of the computing device at the time associated with the selected point-in-time snapshot.

7. The computing device of claim 5, wherein the hypervisor is further configured to:

associate the virtual machine clone with a unique name that is different from the name of the computing device; and register the unique name of the virtual machine clone with an active directory.

8. The computing device of claim 5, wherein the volume snapshot service of the host operating system is the Windows Shadow Copy Service (VSS).

9. A non-transitory computer readable storage medium comprising one or more sequences of instructions, the instructions when executed by one or more processors causing the one or more processors to execute the operations of:

in a hypervisor running within a host operating system on the host computing device, receiving a request to boot a virtual machine clone of the host computing device on the host computing device from which the virtual machine clone is cloned;

in response to the request, synthesizing, by the hypervisor, for each local physical disk of the host computing device, a virtual disk that is comprised of a master boot record (MBR) of the host computing device, a read-only snapshot obtained from a volume snapshot service of the host operating system of the host computing device from which the virtual machine is cloned and a delta virtual disk, wherein the synthesized virtual disk is a thinly provisioned virtual machine disk initially of a same logical size as the MBR contained in a first sector of the synthesized virtual disk, and subsequently grows as changes are made to the delta virtual disk over time; and booting the virtual machine clone of the host computing device from the synthesized virtual disk on the host computing device from which the virtual machine clone was cloned;

wherein booting the virtual machine clone includes deploying an input/output (I/O) filter in the hypervisor and attaching the I/O filter to the synthesized virtual disk, the I/O filter configured to intercept disk block requests from a guest operating system (OS) of the virtual machine clone before the disk block requests are passed to a virtual disk of the virtual machine clone, wherein the I/O filter:

in response to a get disk size request, returns a size of the corresponding local physical disk of the host computing device;

in response to a read block request, fetches the block from the read-only snapshot if the block is part of a partition of the corresponding local physical disk, otherwise, if the request is for the MBR or for a block that is not part of any partition, it is passed on to the thin-provisioned virtual machine disk; and in response to a write block request, fails due to the I/O filter providing only read-only access, wherein all write block requests are passed to the delta virtual disk.

10. The non-transitory computer readable storage medium of claim 9, wherein receiving the request to boot the virtual machine clone further comprises:

receiving a selection of a snapshot from a plurality of point-in-time snapshots of the host computing device displayed to a user, wherein the virtual machine clone is associated with a state of the host computing device at the time associated with the selected point-in-time snapshot.

11. The non-transitory computer readable storage medium of claim 9, further comprising instructions to cause the one or more processors to execute the operations of:

associating the virtual machine clone with a unique name that is different from the name of the host computing device; and registering the unique name of the virtual machine clone with an active directory.

* * * * *